(12) United States Patent
Miksovsky

(10) Patent No.: US 7,013,297 B2
(45) Date of Patent: Mar. 14, 2006

(54) EXPERT SYSTEM FOR GENERATING USER INTERFACES

(75) Inventor: Jan Thomas Miksovsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 10/083,022

(22) Filed: Feb. 26, 2002

(65) Prior Publication Data

US 2002/0118225 A1    Aug. 29, 2002

Related U.S. Application Data

(60) Provisional application No. 60/272,006, filed on Feb. 27, 2001.

(51) Int. Cl.
*G06N 5/04*    (2006.01)

(52) U.S. Cl. ............................ 706/60; 706/14; 706/12
(58) Field of Classification Search ................. 706/60, 706/14, 12
See application file for complete search history.

(56) References Cited

U.S. PATENT DOCUMENTS

| | | | |
|---|---|---|---|
| 5,644,686 A | | 7/1997 | Hekmatpour |
| 5,774,357 A | | 6/1998 | Hoffberg et al. |
| 5,877,759 A | * | 3/1999 | Bauer ........................ 719/317 |
| 6,262,730 B1 | * | 7/2001 | Horvitz et al. .............. 345/707 |
| 6,434,578 B1 | | 8/2002 | McCauley et al. |
| 2002/0035501 A1 | * | 3/2002 | Handel et al. ................ 705/10 |
| 2002/0069189 A1 | * | 6/2002 | Bertrand et al. .............. 706/45 |

OTHER PUBLICATIONS

Frazer Bennett et al, Teleporting—Making Applications Mobile, 1995, IEEE, 82-84.*
Martin Zimmermann et al, Specification and Implementation of Reconfigurable Distributed Applications, 1994, IEEE, 23-24.*
U.S. Appl. No. 08/669,781, filed Jun. 26, 1996, McCauley et al.

* cited by examiner

*Primary Examiner*—Joseph P. Hirl
(74) *Attorney, Agent, or Firm*—Christensen O'Connor Johnson Kindness PLLC

(57) ABSTRACT

An expert system for generating user interfaces is provided. The expert system includes one or more components for realizing one or more intentions of a user interface designer. Each intention, when received by the expert system, identifies and activates a corresponding component for realizing the received intention. Each component programmatically contains a set of rules extracted from guidelines, conventions, and principles of user interface design. A set of parameters is also supplied with each received intention to aid the corresponding component to choose and execute a rule from the set of rules. Each rule produces a user interface from a template different from other templates used by other rules.

19 Claims, 12 Drawing Sheets

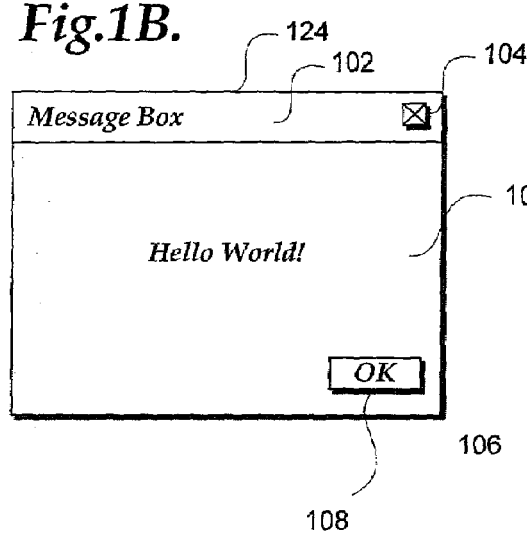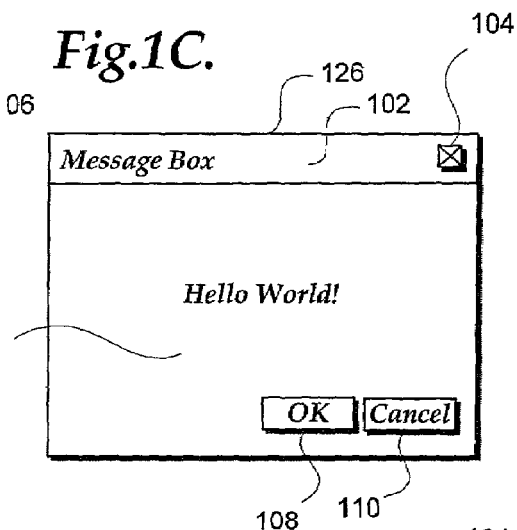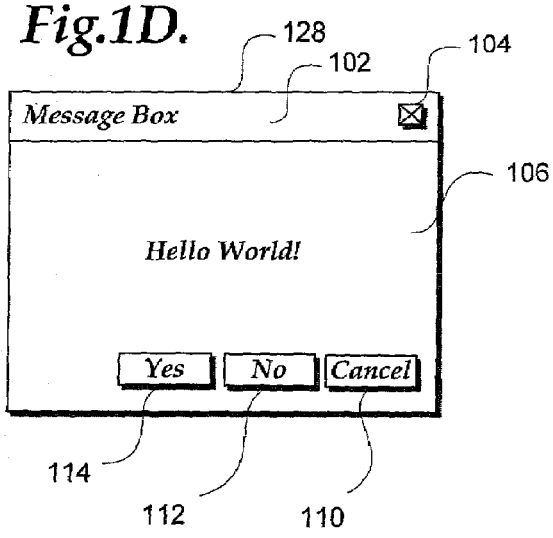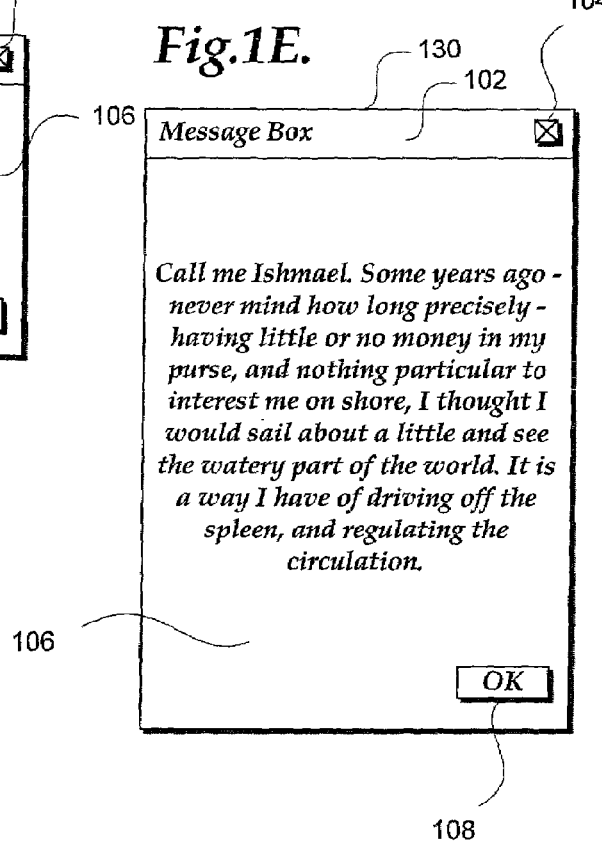

EXPERT SYSTEM FOR GENERATING USER INTERFACES

CROSS-REFERENCE TO A RELATED APPLICATION

This application claims the benefit of U.S. Provisional Application No. 60/272,006, filed Feb. 27, 2001, which is expressly incorporated herein by reference.

FIELD OF THE INVENTION

The present invention relates generally to expert systems and, more particularly, to a piece of software that receives intentions of a user interface designer from an application and realizes the intentions by making decisions to generate user interfaces from a set of programmatic rules, which are based on knowledge of experts in the field of user interfaces as embodied in guidelines, conventions, and principles of user interface design.

BACKGROUND OF THE INVENTION

A user interface is a portion of a program or an operating system through which a user can instruct a computing device to accomplish a result and through which the device can convey information to the user. Examples of computing devices are computers, portable electronic devices such as telephones, and interactive television units. (Hereafter, the term computer is used to refer generally to all computing devices.)

A graphical user interface is a user interface that makes use of a computer monitor or other type of display (such as a television) as an output device, and one or more input devices, typically a computer keyboard and a pointing device, such as a mouse, that affect the display. The computer displays information to the user in screens. A screen may take up the entire viewable area of the display, or may take up only a portion of the viewable area in the form of a window. Another example of a user interface is an audio user interface in which the user speaks to the computer through a microphone input device, and the computer responds via a speaker output device. Some user interfaces support multiple modes of interaction (e.g., graphical and audio).

Software programmers create user interfaces with programming languages that allow access to a computer's input and output devices. However, these user interfaces need not be created from scratch. For example, with reference to FIG. 1A, a collection of user interface routines may be stored in a library (not shown) resident in an operating system, such as the Microsoft Windows operating system 118 (hereafter, "Windows 118"). To invoke a user interface routine in the library, software programmers place a function call, which invokes a corresponding routine in the library, at an appropriate place in a program 116. When the computer that is running the program 116 comes to the function call, the computer executes the function call and transforms the function call into a request for service from the corresponding user interface routine in the library.

Each function call includes a set of input arguments. The input arguments are passed along to the corresponding user interface routine when the function call is executed by the computer. Each routine is designed to present a user interface from a particular template, such as a dialog box 120, which is a special window that solicits a response from a user. The input arguments provide information that may affect the presentation of the dialog box 120. Each function call has a one-to-one correspondence with a single template in one routine. There is an expectation that for each function call a precise instance of a particular template will appear. There can be no deviation since any deviation is considered a bug in Windows 118.

FIGS. 1B–1E illustrate message boxes 124–130, which are a type of the dialog box 120. The template from which each message box is formed includes a title bar 102, which is a horizontal space at the top of the message box that contains the name of the message box, and a close button 104, which is a square button that is usually located in the right corner of the title bar with an x mark on it. The template for the message box also includes a screen 106 for containing messages as well as one or more buttons to allow the user to interact with the message box.

The message box 124 in FIG. 1B presents a message "Hello world!" to a user along with an OK button 108. The function call to create the FIG. 1B message box 124 may be of a form: messageBox("Hello World!", OK), which is a function call having a name "messageBox" and two input arguments "Hello World!" and "OK." The FIG. 1C message box 126 is similar to the FIG. 1B message box 124, except that the FIG. 1C message box 126 also includes a Cancel button 110. The function call to create the FIG. 1C message box 126 may have a form: messageBox("Hello World!", OK_CANCEL). The FIG. 1D message box 128, like the FIGS. 1B–1C message boxes 124, 126, contains the message "Hello World!". The difference is that the FIG. 1D message box 128 includes a YES button 114, a NO button 112, as well as the Cancel button 110, but no OK button 108. The function call to create the message box 128 may have the form: messageBox("Hello World!", YES_NO_CANCEL).

The input arguments to the function call that creates the FIG. 1E message box 130 includes a long string of text "Call me Ishmael . . . " and the OK button 108. The user interface routine that corresponds to the function call that creates the FIG. 1E message box 130 increases the vertical space of the FIG. 1E message box 130 so as to accommodate the long string of text. A form of the function call to create the FIG. 1E message box 130 include a signature, such as message-Box("Call me Ishmael . . . ", OK). FIGS. 1B–1E illustrate that a the function call messageBox( . . . ) is made from the program 116, a messageBox template in Windows 118 is used to create message boxes 124–130. Modifications to a message box template can be made by furnishing certain information through the input arguments to the function call messageBox( . . . ), but a modified message box is still a kind of a message box, and no deviation will be made by Windows 118.

User interfaces can be constructed directly in the programming languages used by software programmers as discussed above with reference to FIGS. 1A–1E, but are more often constructed using specialized user interface development tools. For example, graphical user interfaces are often constructed using a tool called a forms package. A forms package typically presents the programmer with a screen (also called a form) that approximates what the user will see. The forms package allows the programmer to add individual graphical user interface controls (e.g., buttons, text entry boxes, list boxes) to the screen, and arrange the controls on the screen. The forms package also allows the programmer to indicate how the screen and its controls should react to user actions, such as when the user clicks on a button control with a mouse. Typically, the programmer defines these reactions explicitly by writing routines in computer code, and then connecting controls on the screen to those routines. Specific user events then trigger the execution of the associated code routines.

A graphical user interface for a program may consist of one or many screens. Forms packages allow the programmer complete freedom in constructing user interfaces with whatever screens the programmer desires. However, with this freedom comes the opportunity to make many mistakes. The programmer may create a user interface that is too complex for its users to understand and use properly. The programmer may inadvertently create a user interface with bugs. An example of a bug is failing to handle correctly the entire range of possible input conditions.

To reduce the likelihood of problems, programmers typically have learned to manually follow user interface guidelines and de facto conventions that suggest how user interfaces should appear and behave. For example, FIG. 7 shows a type of screen in a graphical user interface, in which the user is asked to choose one of four items. A window 702 contains text 704 instructing the user to make a selection from the option buttons 706, 708, 710, and 712. In this example, option button 706 is shown selected. Only one of the option buttons 706, 708, 710, and 712 can be selected at a given time. The user selects one of the buttons, and then clicks an OK button 714 to indicate that he is finished. The user can also click a Cancel button 716 to indicate that he does not wish to make a selection.

As an example of the conventions at work in this screen, consider the standard placement of the OK button 714 and the Cancel button 716 beneath the option buttons 706, 708, 710, and 712. This convention stems from the fact that a user will interact with the option buttons first and the OK button or the Cancel button second, and that people generally read a screen from top to bottom. It is also acceptable (and within convention) to place the buttons 714, 716 to the right of the option buttons, because the English language (and many other languages) is read from left to right. It is unacceptable, however, to put the buttons 714, 716 at the top of the screen above the option buttons 708–712, because a user would be likely to press the OK button 714 or the Cancel button 716 before selecting an option.

The controls on the screen shown in FIG. 7 form a familiar pattern. Many programmers create screens that follow the pattern shown in FIG. 7 even if the specific purpose of the screen is different. In time, users of graphical user interfaces may become familiar with such patterns, thereby increasing their efficiency with a program. They may be able to more quickly learn new screens if the screens conform to patterns they have seen previously.

Most software programming environments do not offer any way to take advantage of such user interface patterns. If the programmer wishes to employ in his program a choice selection screen that follows the same pattern as the one shown in FIG. 7, he typically must use a forms package to create such a screen from scratch using basic graphical user interface controls. Because the programmer generally defines the appearance and behavior of the screen from scratch, he may implement the user interface incorrectly, thereby inadvertently introducing bugs. This may occur even when the programmer is trying to create a screen that follows a familiar pattern.

Even for simple user interface patterns, it may be difficult for the programmer to correctly follow the pattern. The programmer needs to get a number of details correct in order for users to gain any advantage from the use of the pattern. Examples of such details include, but are not limited to, choosing the correct set of controls, providing conventional or otherwise meaningful labels for these controls, arranging the controls correctly on the screen, supporting all available modes of user input (keyboard, pointing device, voice recognition, etc.), correctly handling all conditions and errors, enabling the interface to be used correctly in a variety of locales and languages, and enabling the interface to be used correctly by people with a variety of physical disabilities (color blindness, nearsightedness, blindness, slow physical coordination, etc.).

Moreover, the guidelines for determining which type of user interface pattern is appropriate in a given situation are not trivial. Consider a situation in which a programmer wishes to present the user with a series of choices and require the user to select exactly one of the choices. Suppose the programmer is creating a graphical user interface for use on the Microsoft Windows operating system. Microsoft Corporation publishes a set of user interface guidelines for programs designed for Windows ("Microsoft Windows User Experience: Official Guidelines for User Interface Developers and Designers", Microsoft Press, 1999). These guidelines suggest at least three different types of controls that could be employed in this situation:

1) Option buttons: "An option button, also referred to as a radio button, represents a single choice within a limited set of mutually exclusive choices. That is, the user can choose only one of a set of options. Accordingly, always group option buttons in sets of two or more . . . . Limit the use of option buttons to small sets of options, typically seven or less, but always at least two. If you need more choices, consider using a different type of control, such as a single selection list box or drop-down list box." (p. 164)

2) Single-selection list boxes: "A list box is a control for displaying a list of choices for the user . . . . List boxes are best for displaying large numbers of choices that vary in number or content . . . . A single-selection list box is designed for the selection of only one item in a list. Therefore, the control provides a mutually exclusive operation similar to a group of option buttons, except that a list box can handle a large number of items more efficiently. Define a single-selection list box to be tall enough to show at least three to eight choices . . . depending on the design constraints of where the list box is to be used." (pp. 170–4)

3) Dropdown list boxes: "Like a single-selection list box, a drop-down list box provides for the selection of only a single item from a list; the difference is that the list is displayed upon demand . . . . While drop-down list boxes are an effective way to conserve space and reduce clutter, they require more user effort to browse and select an item than a single-selection list box." (p. 175)

Portentously, the decision as to which control should be used is left to the programmer. The programmer must evaluate the situation at hand, compare it to the available guidelines and conventions, and then make an appropriate selection. Failure to select the appropriate pattern may risk confusing users.

Complicating the programmer's decision is that, at the time the programmer is writing the program, the programmer is typically unable to know the exact conditions under which the user interface will be used. A program may need to offer the user a list of choices where the number of choices varies greatly depending upon factors that change (e.g., the program needs to display a list of people currently connected to a computer network). The programmer is often forced to make decisions based on a theoretical or estimated range of values for such a factor. The decision made at the time of writing the program may result in a user interface that is inappropriate in practice.

SUMMARY OF THE INVENTION

The present invention moves much of the burden of identifying and constructing an appropriate user interface pattern to an expert system, which is programmed to follow guidelines, conventions, and principles of user interface design. A programmer writes an application in a traditional manner, but does not need to create a complete user interface for the application. Instead, the programmer writes code to reflect his intentions for the purpose of the user interface and these pieces of code invoke the expert system, which completes the user interface of the application. The expert system generates an appropriate user interface on the fly and returns this interface to the application. The application then invokes this user interface, which controls user interaction. The user interface communicates with the application as necessary. The user interface eventually returns control to the application when the user interface receives some indication from the user's interaction. Instead of generating the user interface on the fly, alternatively, the expert system generates and stores the user interface for later use during runtime of the application. The programmer can use the expert system to generate an application's entire user interface or just a portion of it.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1B–1E are a pictorial diagram illustrating various presentations of a message box, which depend on the values of the input arguments to a user interface function call.

DETAILED DESCRIPTION OF THE PREFERRED EMBODIMENT

Figure 1A:
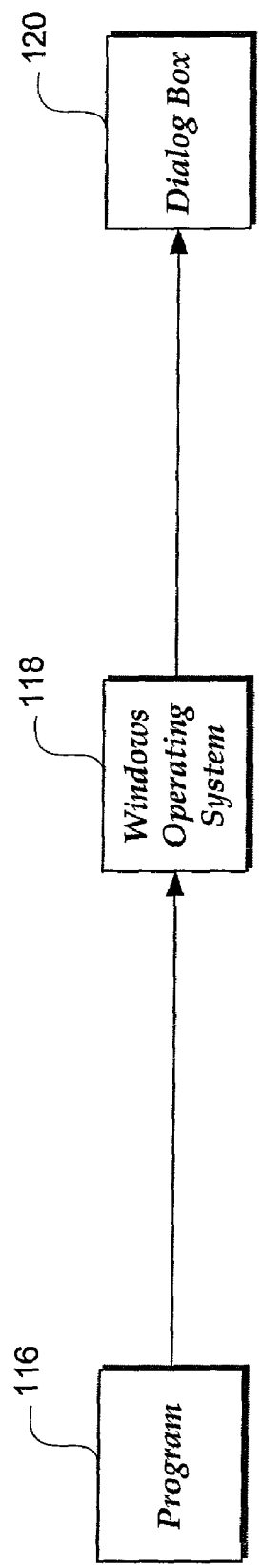
FIG. 1A is a block diagram illustrating a one-to-one correspondence between a user interface function call in a program, a specific user interface routine in an operating system, and a corresponding presentation of a user interface from a specific template.
Figure 2:
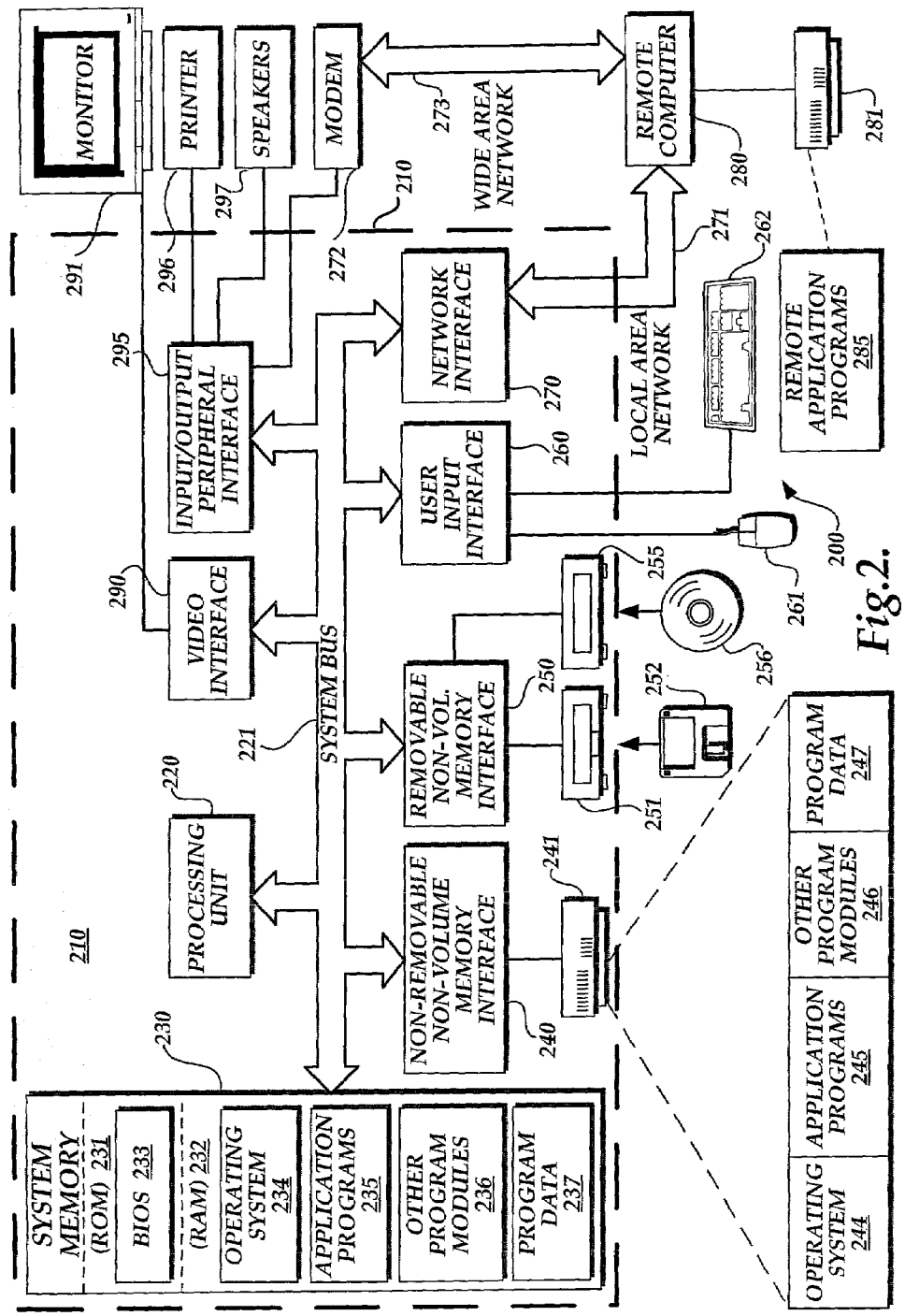
FIG. 2 is a block diagram illustrating a computing device.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc., that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

With reference to FIG. 2, a system for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embodies computer readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF infrared, and other wireless media. A combination of any of the above should also be included within the scope of computer readable media.

The system memory 230 includes computer storage media in the form of volatile and/or nonvolatile memory such as read-only memory (ROM) 231 and random access memory (RAM) 232. A basic input/output system 233 (BIOS), containing the basic routines that help to transfer information between elements within computer 210, such as during startup, is typically stored in ROM 231. RAM 232 typically contains data and/or program modules that are immediately accessible, and/or presently being operated on, by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk write 251 and optical disk drive 255 are typically connected to the system bus 221 by a removable memory interface, such as interface 250.

The drives and their associated computer storage media discussed above and Illustrated in FIG. 2 provide storage of computer readable instructions, data structures, program modules, and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communications link between the computers may be used.

Figure 3A:
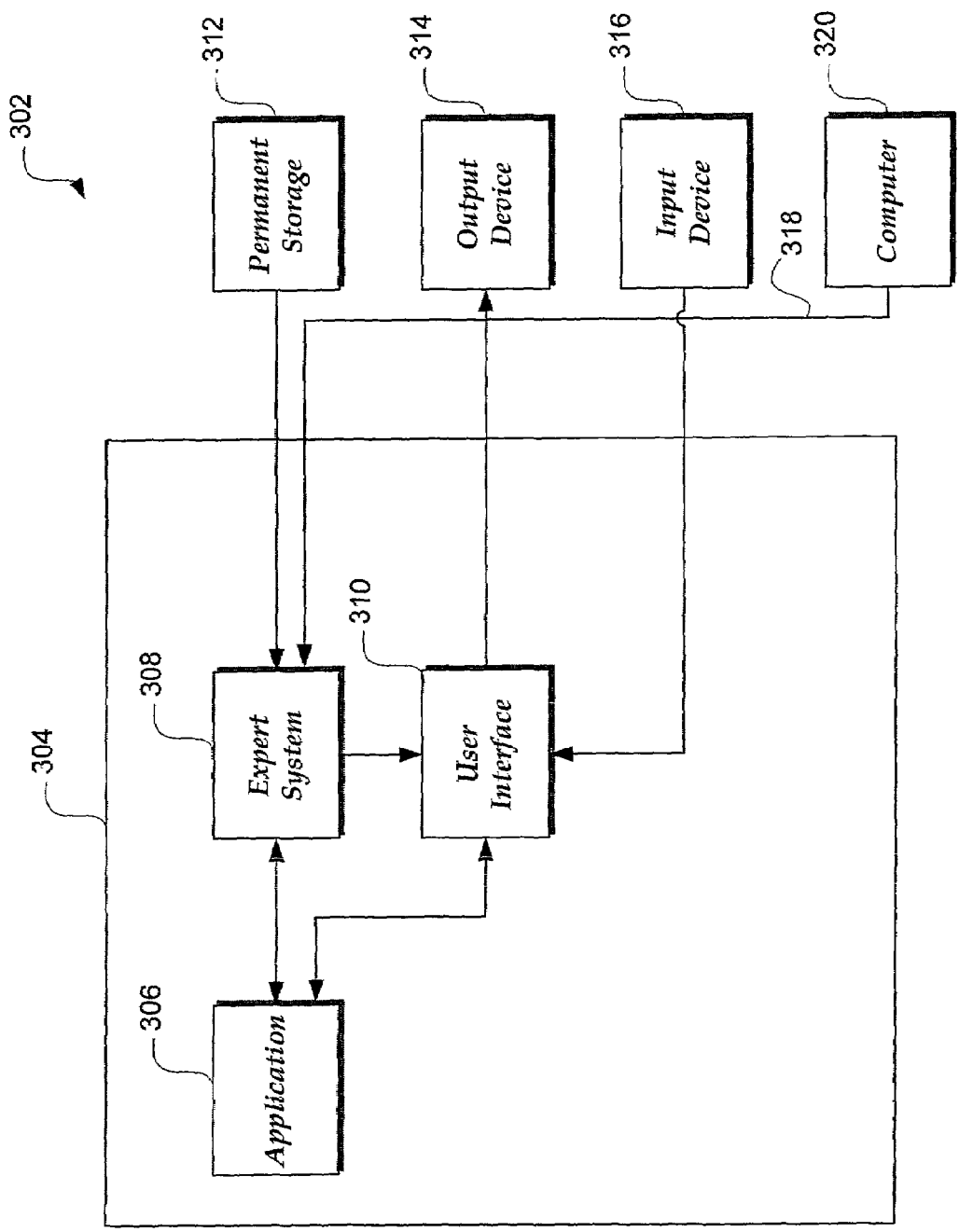
FIG. 3A is a block diagram illustrating a computing system that contains an expert system for generating user interfaces according to one embodiment of the invention.

FIG. 3A depicts a computer 302 suitable for practicing the preferred embodiment of the present invention. An area of memory 304 contains an application 306 written by the programmer. This application 306 invokes an expert system 308. The expert system 308 considers information passed to it from the application 306 and possibly also examines external factors stored on a permanent storage device 312 or on another computer 320 connected via a network 318. The expert system 308 generates a user interface 310 and returns the user interface 310 to the application 306. The application 306 invokes the user interface 310 to interact with the user right after the user interface 310 is created or at runtime if the generated user interface 310 has been stored away. The user interface 310 controls this interaction by communicating information to the user via an output device 314 and receiving input from the user via an input device 316. When the interaction is complete, the user interface 310 returns any result of the interaction to the calling program 306.

Figure 3B:
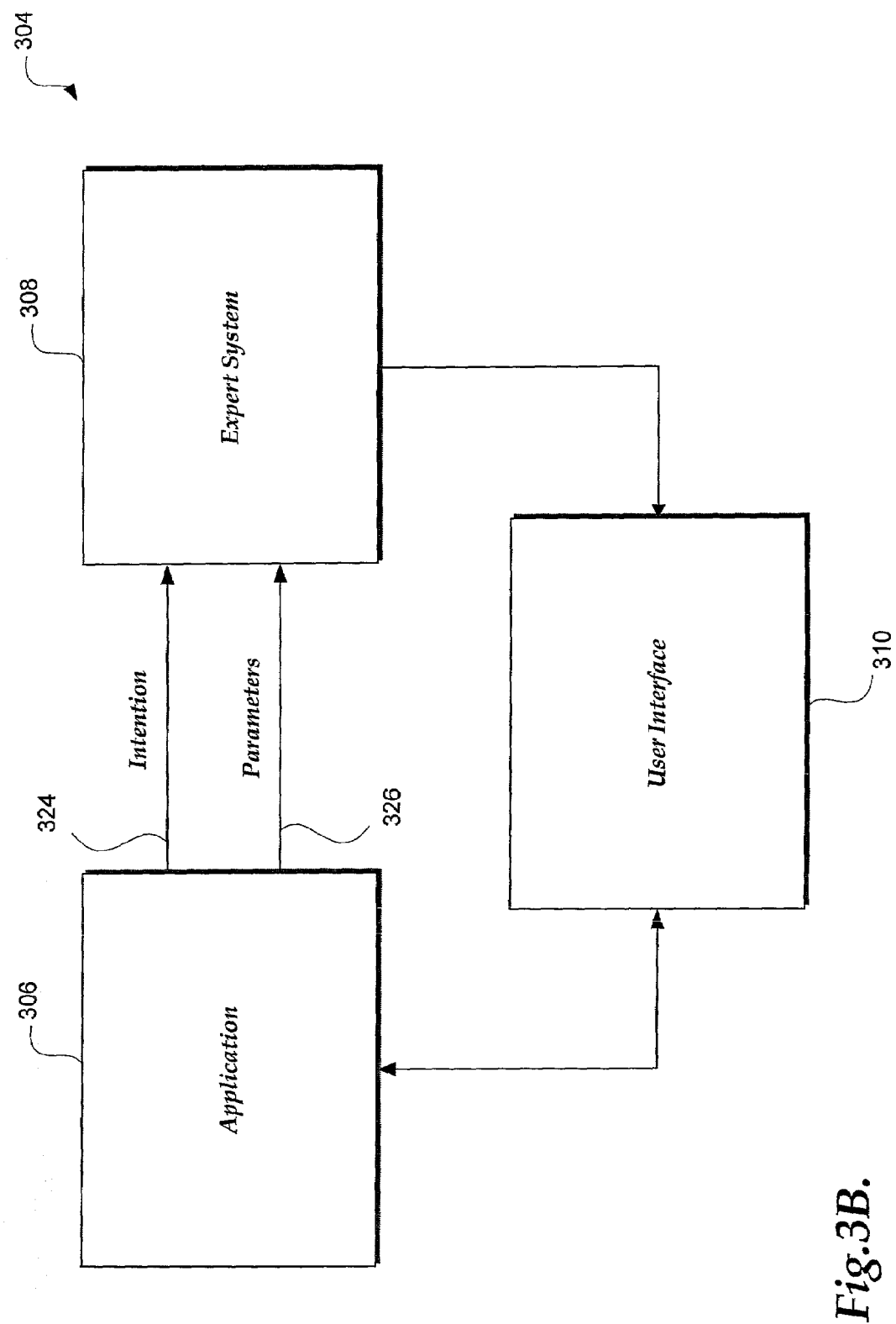
FIG. 3B is a block diagram illustrating in greater detail the intentions of the user interface designer and parameters to an expert system for generating user interfaces according to one embodiment of the invention.

The programmer or a user interface designer begins the process of generating the user interface 310 by indicating the user interface goal or his intention to the expert system 308. FIG. 3B illustrates in greater detail the communication of a user interface goal or an intention (hereafter, user interface goal(s) 324 or intention(s) 324) to the expert system 308. Intentions 324 are stored in the application 306. The application 306 may have an incomplete user interface. When intentions 324 are communicated to the expert system 308 to generate the user interface 310, the incomplete user interface of the application 306 is completed. Many suitable techniques to implement intentions 324 can be used. One suitable technique includes storing intentions 324 on the application 306 as function calls. Each function call has a set of parameters 326 associated with it. Various kinds of user interface goals or intentions are possible, such as what sort of question to ask the user, what sort of information to communicate to the user, or what sort of task to have the user perform. Examples of such user interface goals or intentions include the following:
1) Have the user supply a single string of text.
2) Have the user supply a single number (e.g., an integer greater than zero).
3) Have the user pick a single item from a list.
4) Have the user pick several items from a list.
5) Have the user arrange the items in a list into a preferred order.
6) Have the user manage a list of items (add items, edit them, remove them).
7) Have the user organize items in a given structure (e.g., a hierarchy).
8) Have the user move or copy items between two containers (e.g., files between two folders).
9) Have the user apply one or more operations on a selection of items in a list.

In addition to indicating a user interface goal or an intention 324, the programmer can supply parameters 326 to the expert system 308 that further specify the programmer's intent, or otherwise assist the expert system 308 in generating a meaningful user interface. The expert system 308 may also require the programmer to supply some parameters 326 depending on the specified user interface goal or intention. Other parameters may be optional. Examples of parameters 326 include:
1) The text of the question or instructions the programmer would like to offer the user
2) The choices from which the user is expected to make a selection (for example, a list of text strings)
3) The data the programmer wishes to allow the user to manipulate
4) The default response to a question
5) An indication of whether the user is required to respond to a question or whether the user can opt out of the question
6) The type of data the programmer expects to be received in response to the interaction with the user (both for validity checking and to determine the type of display that would be most effective)
7) Constraints on the amount of horizontal and vertical space the programmer may wish to impose on the generated user interface
8) Indications of the visual style the programmer would prefer in the generated user interface (for example, whether the expert system should generate a user interface with a conservative visual style that allows the user to focus on the task at hand, or a user interface with a visually engaging style that is meant to entertain).

The expert system 308 may also examine external factors available to it in making a decision about which user interface is most appropriate. These external factors might include:
1) What type of computer is the program running on? For example, the speed of the device's central processor may place limits on the amount of processing acceptable for the user interface to perform.
2) What operating system is the program running on? While many modern operating systems provide similar user interfaces, each operating system may define its own conventions for how certain kinds of interactions should be conducted.
3) What types of input devices are available? Most personal computers will have at least a computer keyboard, and will also have a pointing device such as a mouse. Other devices may have touch screens, microphones for voice input, and other input devices. For example, a telephone will have a numeric keypad.
4) What types of output devices are available? Most devices will have a screen, in which case various screen attributes may be relevant: its physical size, its resolution (the number of pixels it can display), and how many colors it can display. Another example of an output device is an audio speaker.
5) Who is the typical user to whom these questions will be asked? Relevant factors might include expectations of the typical user's age, nationality and cultural background, the languages spoken or read, degree of general computer experience, physical abilities, and the physical environment in which the user will use the product.
6) What is known about the specific individual to whom the present question is being asked? The expert system may include specific answers to the above general user attributes for a previously identified individual.
7) What is the history of the specific user's experience with this question or similar questions in the past? For example, if the user has never faced this question before, he may require a user interface that provides more explicit assistance. If, on the other hand, the user has faced this question many times before, and always provided the same response, the expert system may offer the user's usual response as a default—or the expert system may generate a user interface that displays nothing to the user and immediately returns the default response.
8) What other software is available on the machine? The expert system may decide to employ other software applications in forming the user interface it will use to ask a question.
9) What are the current values of various data the expert system has access to? The expert system may choose a user interface based on various facts about the world that it can perceive through the machine, such as the time of day. Additionally, if the machine has access to a network of other devices (such as the Internet), the expert system may be able to use data from the network to inform its selection and design of a user interface.

Importantly, the user interface generated by the expert system 308 for an intention may be radically different under different input conditions—or even under identical input conditions (because external factors may have changed). That is, the expert system 308 may offer the programmer no guarantee it will generate the same user interface if invoked multiple times with the same intention and the same set of parameters 326.

If the expert system 308 is generating a graphical user interface, the generated user interface 310 may include a single screen, a sequence of multiple screens, or include no screens at all. Here, "screens" is used generally to refer to either the entire visible display area on an output device, or a window contained within a larger display, or a portion of a window. The generated user interface can include screens encapsulated in pagefunctions, which are described in U.S. application Ser. No. 10/083,023, filed Feb. 26, 2002, titled "PAGEFUNCTION ARCHITECTURAL SOFTWARE FRAMEWORK," and which is incorporated herein by reference. For generated user interfaces that do include screens, the controls on the screens may vary from invocation to invocation, as may the controls' attributes: their labels, positions, sizes, contained values, etc. The expert system 308 may also generate other types of user interfaces other than graphical user interfaces (e.g., audio user interfaces).

Figure 3C:
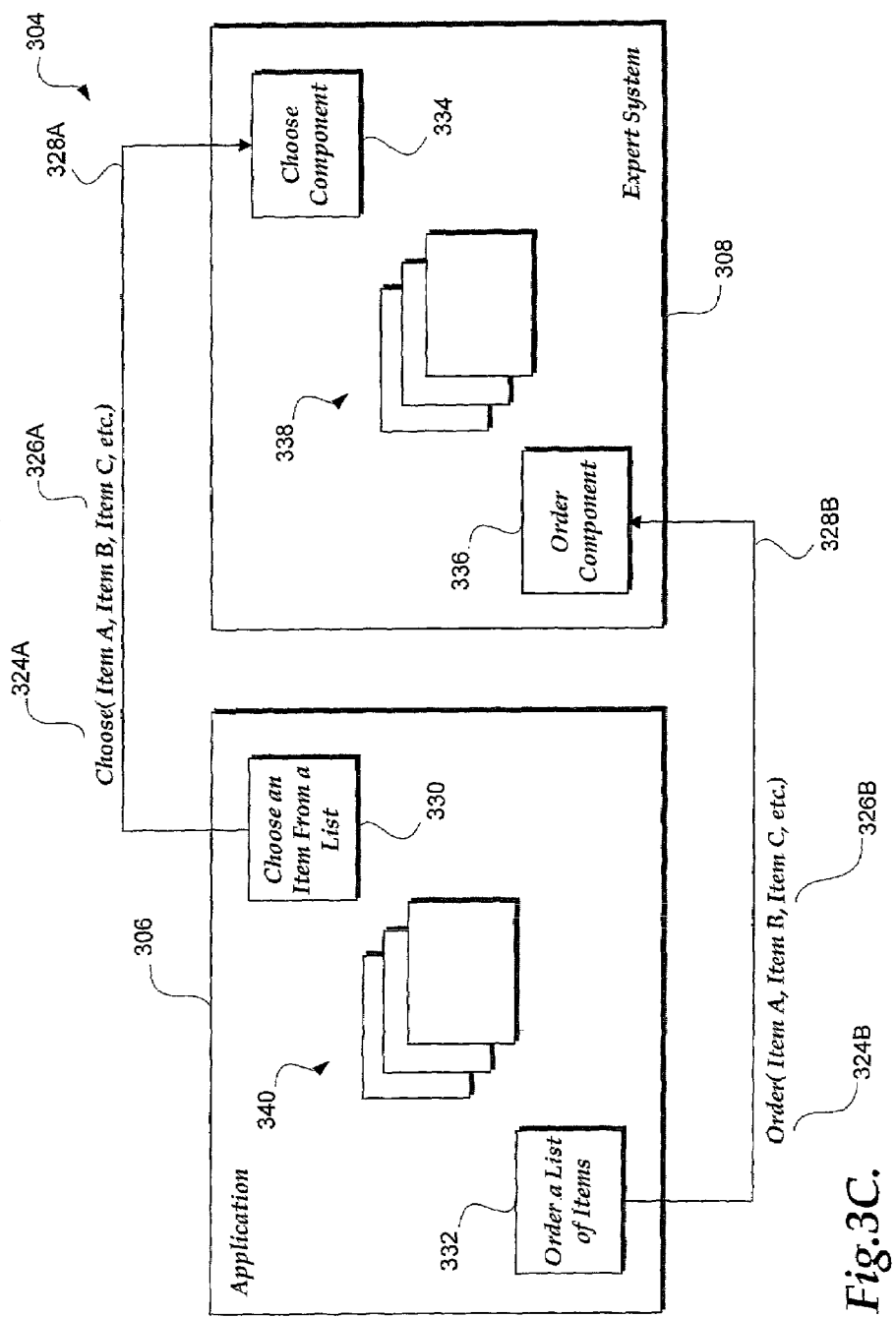
FIG. 3C is a block diagram showing in greater detail the interaction between an application, which sends one or more intentions of a user interface designer to an expert system, and an expert system receiving the one or more intentions from the application so as to generate user interfaces according to one embodiment of the invention.

With reference to FIG. 3C, the expert system 308 is implemented as a collection of code modules or components 334–338. Each code module is designed to generate appropriate user interfaces for a single type of user interface goal or intention. In other words, each code module has access to different kinds of templates to realize the user interface goal or intention. The programmer indicates his user interface goal or intention by writing programming code for the application 306 that invokes the relevant code module. In order to be invoked properly, a code module may require the application 306 to supply certain parameters. Upon invocation, a code module may also allow the application 306 to specify additional optional parameters. These required and optional parameters may differ from intention to intention (and, hence, from code module to code module). A code module evaluates the required and optional parameters, and examines any relevant external factors, to determine which sort of user interface is appropriate.

As shown in FIG. 3C, the application 306 includes pieces of written code for representing various intentions of the programmer, such as an intention for ordering a list of items 332, an intention for choosing an item from a list 330, and other intentions 340. Each intention stored on the application 306 can invoke, on the expert system 308, a corresponding code module or component, such as Order component 336, Choose component 334, and other components 338. The Choose component 334 corresponds to the intention for helping a user to choose an item from a list 330. In order for the intention for helping a user to choose an item from a list 330 to correctly invoke the Choose component 334, the intention is written in a particular programmatic form, such as a function call Choose( . . . ) 324A. The parameters for the function call 324A may include a list of items 326A from which a user is to choose. Similarly, the Order component 336 corresponds to the intention for ordering a list of items 332. The intention for ordering a list of items 332 invokes the Order component 336 via the function call Order( . . . ) 324A. A list of items 326B make up the parameters for the function call 324B. Other intentions 340 on the application 306 have corresponding components 338 in the expert system 308. The appropriate component among the components 338 are invoked by a proper function call along with an appropriate set of parameters that should be included in the function call.

Once the expert system code module has determined what sort of user interface is appropriate, the module generates a suitable representation of the user interface 310 and returns the representation to the application 306. Suitable operating environments for various embodiments of the present invention include an object-oriented environment. The user interface 310 can be represented as an object that is dynamically created during program execution, passed between program functions, have its member functions invoked, and have these member functions return results to the invoking program. Such an object will interact with the machine's input and output devices to carry out the requested interaction with the user. One skilled in the art will recognize that embodiments of the present invention can be practiced in a non-object-oriented environment as well.

After the expert system 308 generates the user interface 310 and returns it to the application 306, the calling program 306 will typically invoke the generated user interface 310 immediately. However, it is also possible for the application 306 to store a representation of the user interface 310 on storage media (e.g., a disk) for later use by the application 306 (or, potentially, a different program). The representation of the user interface 310 could also be transmitted to another computer for storage or invocation by a program on that computer. Note, however, that the more time that elapses between the time the user interface is generated and the time it used, the more likely it is that various external factors will have changed from their values at the time they were examined by the expert system 308 thereby, potentially causing the user interface to be inappropriate under the new set of external factors.

Although FIG. 3A depicts the application 306, the expert system 308, and the generated user interface 310 as all residing on the same computer 302, one skilled in the art will recognize that these components could exist on separate computers communicating over a network. For example, the expert system 308 could take the form of a process on an Internet server (not shown) that returns a user interface in the form of a complete or partial HTML (Hypertext Markup Language) page suitable for display in a World Wide Web browser.

Figure 4:
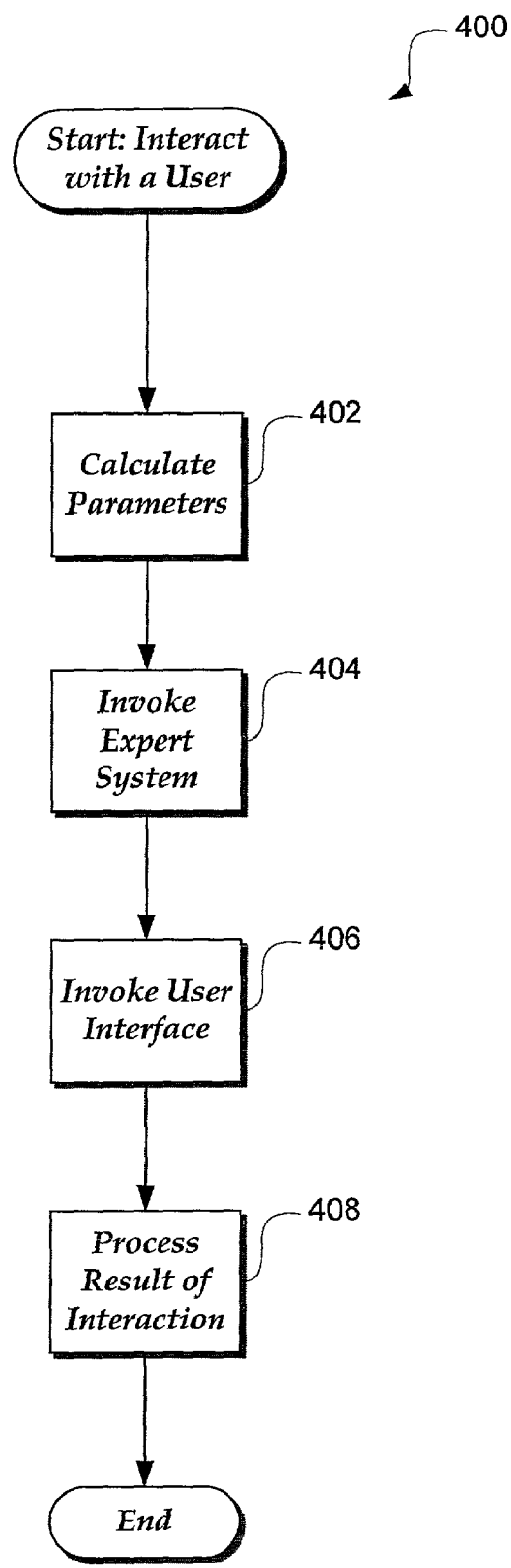
FIG. 4 is a process diagram illustrating a method for invoking an expert system according to one embodiment of the invention.

FIG. 4 is a flow chart of the steps performed in invoking the expert system 308. In step 402, the application 306 calculates a set of parameters that will be passed to the expert system 308. The term "calculate" means the inclusion of the parameters predefined by the user interface designer or parameters that are collected, analyzed, or adapted for a purpose by the application 306. In step 404, the application 306 reflects the programmer's intent by invoking the relevant expert system code module and passing in the relevant parameters. The expert system 308 generates and returns a representation of an appropriate user interface 310. Instep 406, the application 306 invokes this generated user interface 310. The application 306 is not aware of what form the generated user interface 310 will take. The application 306 only knows that it can expect to be notified when the user interface has finished processing, and what the result of the interaction was. Processing continues to step 408, where the application 306 can perform any necessary operations using the result of the interaction with the user.

It is possible for the expert system 308 to offer the application 306 an option to have the expert system 308 itself invoke the generated user interface 310 directly. In this case, instead of returning the generated user interface 310, the expert system 308 returns the result of the interaction with the user. From the perspective of the application 306, such an option effectively combines steps 404 and 406 into a single step.

Figure 5:
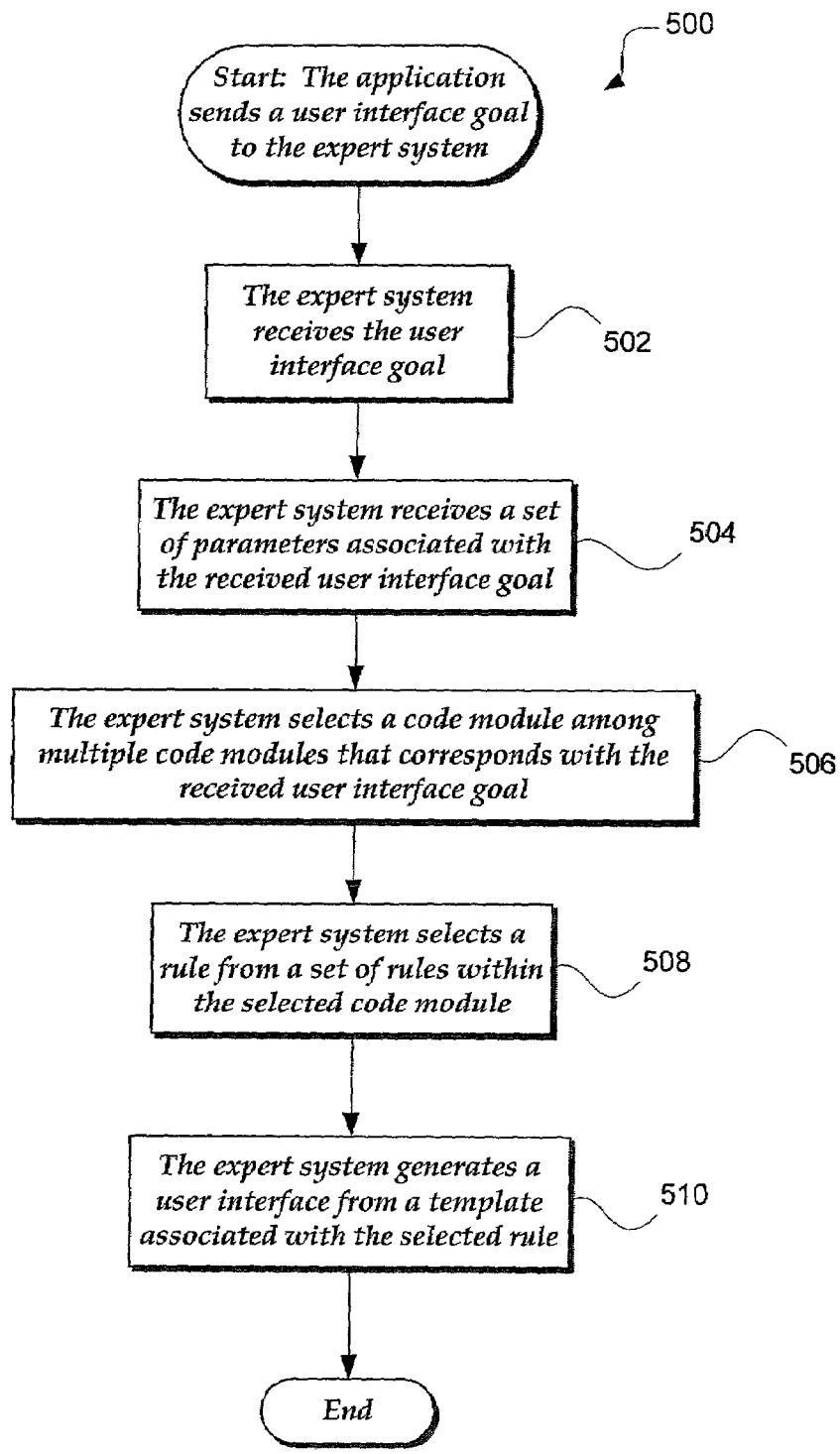
FIG. 5 is another process diagram illustrating a method by which an expert system realizes an intention of the user interface designer to generate a user interface according to one embodiment of the invention.

FIG. 5 illustrates a process 500 where the expert system 308 has received an intention or a user interface goal 324 from the application 306. At a block 502, the expert system 308 receives the user interface goal 324 via a suitable mechanism, such as a function invocation. Along with the function invocation, the expert system 308 receives a set of parameters associated with the function invocation at a block 504.

Next, at a block 506, the expert system 308 selects a code module among multiple code modules 334–338, which corresponds with the received user interface goal among multiple user interface goals. The process 500 flows next to a block 508 where the expert systems 308 selects a rule from a set of rules within the selected code module. The set of rules are programmatically defined in the selected code module. Each code module 334–338 includes different rules extracted from guidelines, conventions, and principles of user interface design. An example of these extracted rules are discussed below with reference to FIG. 6. After a rule is selected, the process 500 enters a block 510. Here, having selected and executed the selected rule, the expert system 308 generates a user interface from a template associated with a selected rule. Each rule within a module corresponds to a different template.

Figure 6:
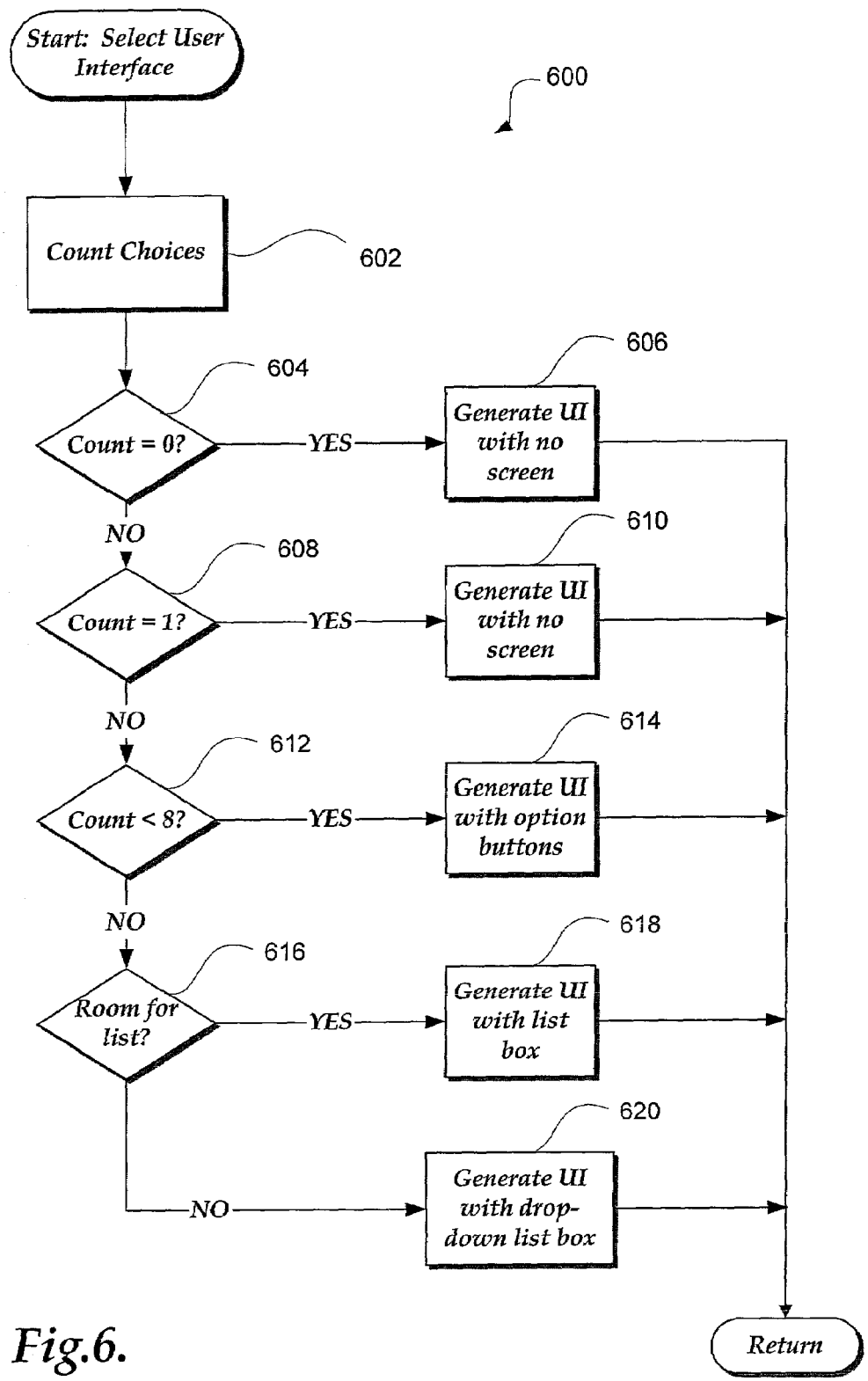
FIG. 6 is a process diagram showing a method inside a sample code module or component of an expert system for realizing an intention of a user interface designer, and more particularly, for showing to a user the available choices according to one embodiment of the invention.

FIG. 6 depicts a set of rules within an implementation of the code module or component 334 designed to address the general goal of having the user select a single item from a list of choices. In this example, the expert system 308 generates a graphical user interface for use on the Microsoft Windows operating system, following the guidelines set forth by Microsoft to determine which type of control is most appropriate for the task. The expert system 308 in this case requires the application 306 to supply a list of choices 326A when the code module is invoked. The programmer can optionally supply constraints limiting the size of any screens generated by the expert system 308 (e.g., to ensure that the screens can fit on a particular display or within a preexisting window). The expert system 308 then determines which sort of user interface will be most appropriate in satisfying the programmer's goal.

In step 602, the expert system 308 counts the number of choices that will be offered to the user. In step 604, the expert system 308 determines whether the count of choices is zero. If it is zero, the user will have no choice to make. In this case, processing continues to step 606, where the expert system 308 generates a user interface 310 containing no visible screens. Upon later invocation, this user interface 310 will immediately return to the application 306, passing back a result that indicates no selection was made by the user.

If the count is greater than zero, processing continues to step 608. Here the expert system 308 determines if the count of choices is exactly one. If so, processing continues to step 610, where the expert system generates a user interface 310 again containing no visible screens. Upon later invocation, this user interface 310 will immediately return to the application 306, passing back a result that indicates the user selected the only available choice.

If the count is greater than one, processing continues to step 612. In this step, the expert system 308 determines that if the count is less than eight (i.e., greater than or equal or two and also less than or equal to seven). If so, processing continues to step 614, where the expert system 308 generates a user interface 310. Upon later invocation, this user interface 310 will display a single screen showing the available choices using option buttons. An example of such a screen is shown in FIG. 7.

If the count is greater than or equal to eight, processing continues to step 616. In this step, the expert system 308 considers whether there are any constraints on the amount of vertical space available to the generated user interface, and if so, whether there is sufficient vertical space to display a single-selection list box displaying at least three items. If there is sufficient room, processing continues to step 618, where the expert system 308 generates a user interface 310. Upon later invocation, this user interface 310 will display a single screen showing the available choices in a single-selection list box. An example of such a screen is shown in FIG. 8.

Otherwise (if there is not enough room for a list box), processing continues to step 620, where the expert system 308 generates a user interface 310. Upon later invocation, this user interface 310 displays a single screen showing the available choices in a drop-down list box. An example of such a screen is shown in FIG. 9B. Once processing completes, the expert system 308 returns to the application 306 and passes back the generated user interface 310.

Figure 7:
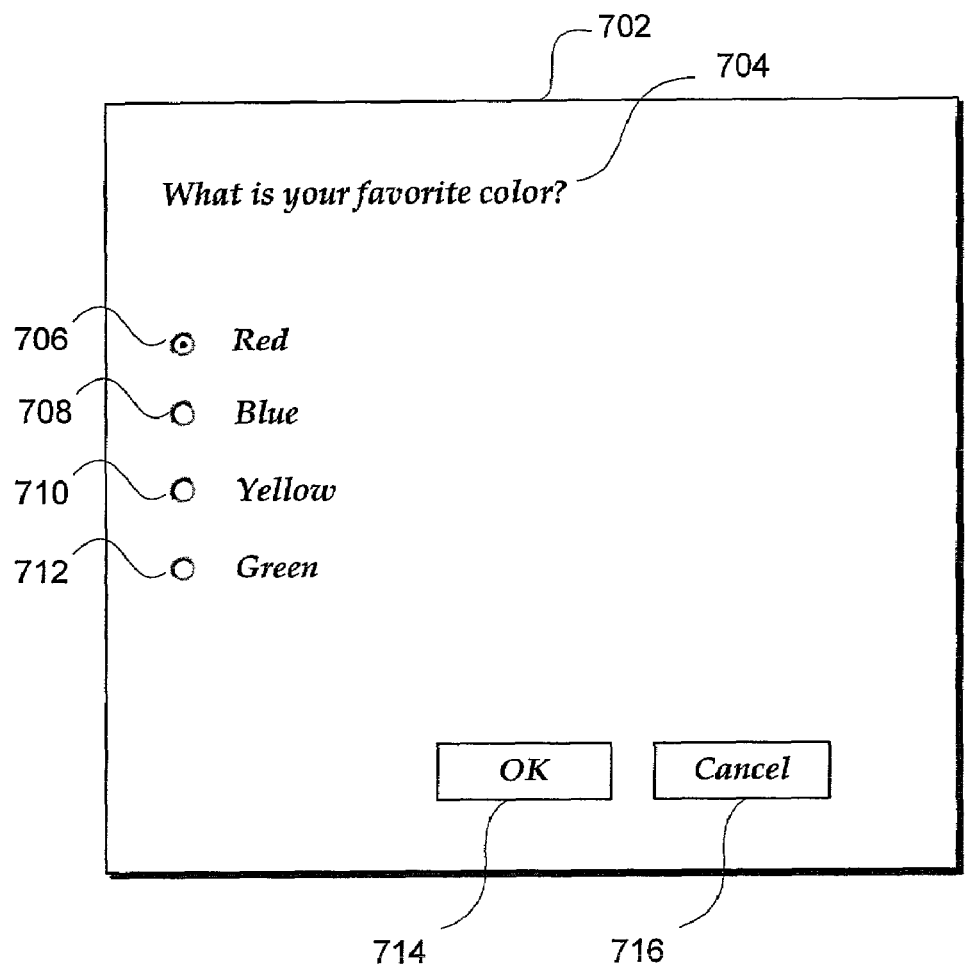
FIG. 7 is a pictorial block diagram illustrating choices available to a user to select using option buttons according to one embodiment of the invention.

FIG. 7 is an example of a graphical user interface screen generated by the expert system 308 in which the user is asked to choose one of four items. A window 702 contains text 704 instructing the user to make a selection from the option buttons 706, 708, 710, and 712. In this example, option button 706 is shown selected. Only one of the option buttons 706, 708, 710, and 712 can be selected at a given time. The user selects one of the buttons, then clicks an OK button 714 to indicate that he is finished. The window is closed, and the user interface returns the user's selection to the application 306. If the user pressed the OK button 714 in the screen state shown, this first option would be returned to the application 306. (This option could be returned, for example, as the integer 1, indicating the first selection, or the text string "Red", for the text of that selection.) If instead the user clicks a Cancel button 716, the window is closed and the calling program is informed that the user did not make a selection. (For example, by returning a special null value, such as the integer −1, that has no meaning in the set of available choices.)

Figure 8:
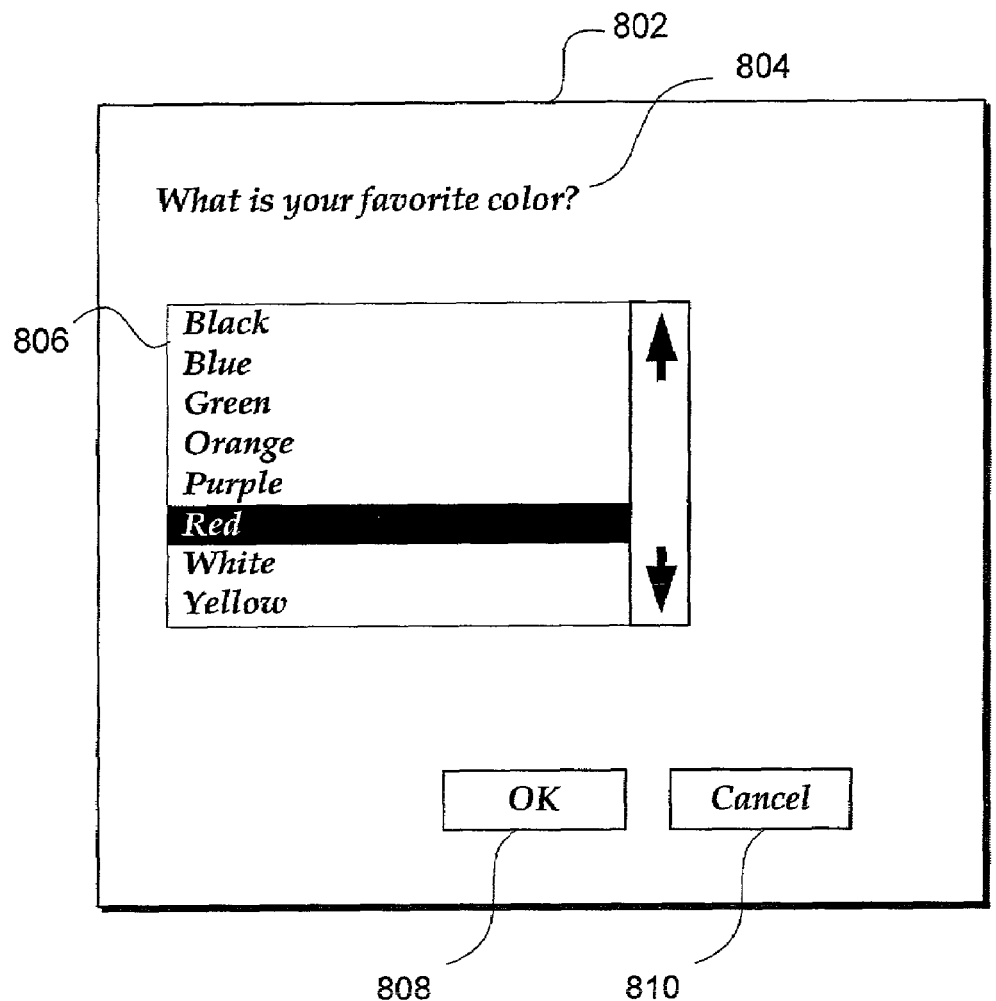
FIG. 8 is a pictorial block diagram illustrating a screen showing the choices available to a user in a single-selection list box according to one embodiment of the invention.

FIG. 8 is an example of a graphical user interface screen generated by the expert system 308, in which the user is asked to choose one of ten items. A single window 802 contains text 804 instructing the user to make a selection from a single-selection list box 806 containing ten items (not all ten are shown). The list box 806 is only tall enough to show eight items. The user must scroll the list box 806 to see all the items. The user selects one of the list items, then clicks an OK button 808 to indicate that he is finished. The window is closed, and the user interface returns the user's selection to the application 306. If instead the user clicks a Cancel button 810, the window is closed, and the application 306 is informed that the user did not make a selection.

Figure 9A:
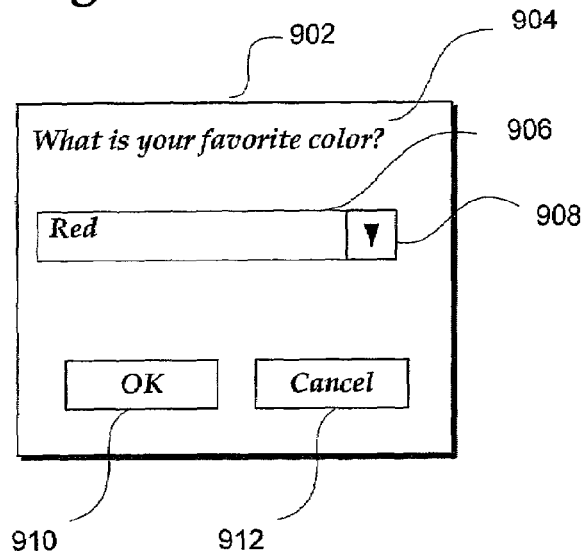
FIG. 9A is a pictorial block diagram of a single screen showing the selected choice of a drop-down list box according to one embodiment of the invention.
Figure 9B:
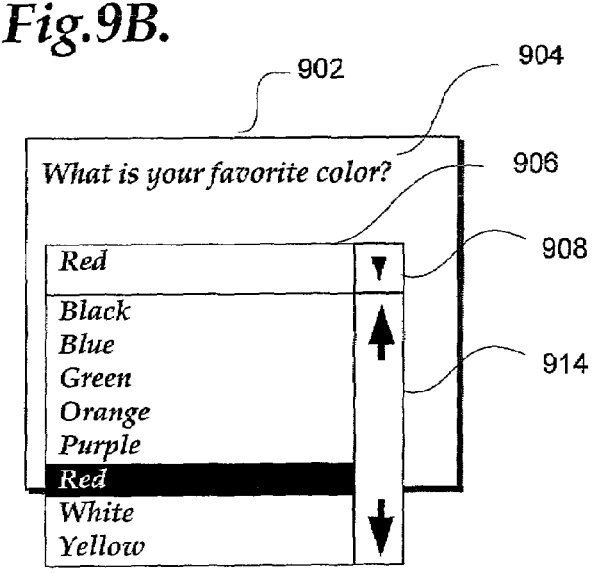
FIG. 9B is a pictorial block diagram illustrating a single screen showing the choices available to a user in a drop-down list box according to one embodiment of the invention.

FIGS. 9A–9B depict another example of a screen in a graphical user interface generated by the expert system 308, in which the user is again asked to choose one of ten items. (Not all ten are shown) Here the programmer has established some constraints on the size of the output display the user interface can employ. Like the screen shown in FIG. 8, the window 902, shown in FIG. 9A, contains text 904 instructing the user to make a selection. Here, however, there is not enough vertical space to use the single-selection list box 806. In this case, the expert system 308 has instead chosen a more compact representation of the choices, a drop-down list box 906. The drop-down list box 906 is initially collapsed to a single line. By clicking the drop-down arrow 908, the user can expand it to reveal a list box 914. This list box 914 displays a portion of the available choices. The user must scroll the list to see the remainder. The user selects one of the items in the list box 914, and then clicks drop-down arrow 908 once more to uncollapse the list to its initial state. The user then clicks an OK button 910 to indicate that he is finished. The window closes, and the user interface returns the user's selection to the application 306. If the user clicks a Cancel button 612, the window 902 is closed instead, and the application 306 is informed that the user did not make a selection.

The expert system 308 is a separable component from the program created by the programmer, and may be separately updated or otherwise modified. Accordingly, multiple programs on the same machine may invoke the same instance of the expert system 308. As the expert system 308 is improved or modified with additional user interface knowledge in subsequent versions, the expert system 308 may make different decisions. Different versions of the expert system 308 may generate different user interfaces given the same intention or user interface goal, set of parameters, and external factors.

In constructing complex user interfaces, the expert system 308 may invoke itself recursively to construct a portion of the user interface. For example, a code module capable of generating a complex graphical user interface with multiple screens may invoke other code modules to generate the individual screens.

A programmer may be content to take advantage of the expert system's 308 existing knowledge of user interface design principles. The programmer may also have the ability to codify new knowledge of user interface design principles (perhaps in some specific domain) by creating new code modules and adding them to the expert system 308 itself. This makes the knowledge available to other programmers as well.

While the preferred embodiment of the invention has been illustrated and described, it will be appreciated that within the scope of the appended claims various changes can be made therein without departing from the spirit and scope of the invention.

The embodiments of the invention in which an exclusive property or privilege is claimed are defined as follows:

1. A method of producing a user interface for an application running on a computer having an associated display, said method comprising:
   a) in response to user interface designer inputs, said application producing at least one intention, said at least one intention having an associated set of parameters;
   b) supplying said at least one intention and its associated set of parameters to an expert system;
   c) in response to receiving said at least one intention and its associated set of parameters, the expert system:
      i) selecting a code module from a multitude of code modules;
      ii) selecting a rule from a set of rules within the selected code module; and
      iii) generating user interface instructions from a template associated with the selected rule;
   d) supplying said user interface instructions to said application; and
   e) in response to receiving said user interface instructions, said application producing a user interface on said display.

2. A system for generating user interfaces so that a user may interact with a computer system, the system comprising:
   an application including an incomplete user interface and being adapted to store multiple intentions of a user interface designer of the application, each intention including a set of parameters and at least one of posing a question to the user, presenting a piece of information to the user, and defining a task for the user to perform, the incomplete user interface of the application being completed when the one or more intentions are realized; and
   an expert system including one or more components for realizing the multiple intentions, the expert system receiving one of the multiple intentions and each received intention identifying and activating a corresponding component for realizing the received intention, each corresponding component programmatically comprising a set of rules extracted from guidelines, conventions, and principles of user interface design, the set of parameters supplied with each received intention aiding the corresponding component to choose and execute a rule from the set of rules, each rule producing a user interface from a template different from other templates used by other rules.

3. The system of claim 2, wherein the produced user interface includes at least one of a graphical user interface, a command-line interface, and an audio user interface.

4. The system of claim 2, further comprising a source of external factors, the source of external factors containing information related to the operating environment of the application as well as the background of the user so as to aid the corresponding component to choose and execute a rule from the set of rules.

5. The system of claim 4, wherein each external factor includes at least one of the type of computer on which the application is running, the type of operating system on which the application is running, the types of available input devices, the types of available output devices, and the background of the user.

6. The system of claim 2, wherein each parameter from the set of parameters includes at least one of textual information, a set of choices from which the user is expected to make a selection, pieces of data which the user is allowed to manipulate, a default response to a question posed by the user, an indication that the user is required to respond to the question, an indication that the user may opt out from responding to the question, a type of data that is expected to be received in response to an interaction with the user, a set of constraints on the dimensions of the generated user interface, and an indication of the visual style which the generated user interface may take.

7. A method for generating user interfaces by an expert system for a user to interact with a computer system, comprising:
   receiving a user interface goal by the expert system, the user interface goal including at least one of a question to be posed to the user, a piece of information to be communicated to the user, and a task to be performed by the user;
   receiving a set of parameters by the expert system, each parameter including at least one of information for presenting to the user, information for the task to be performed by the user, and information for constraining the generated user interface; and
   generating a user interface by selecting a code module from a set of code modules, each code module being designed to generate user interfaces from multiple templates, the act of selecting a code module including selecting a rule from a set of rules extracted from guidelines, conventions, and principles of user interface design, the act of selecting a rule being aided by the set of parameters, the user interface being produced from a template when the selected rule is executed.

8. The method of claim 7, further comprising examining selectively a set of external factors by the expert system, each factor being selected from the operating environment of the computer system and the background of the user, the act of selecting a rule being further aided by the set of external factors.

9. The method of claim 7, wherein a user interface goal includes at least one of making the user supply a single string of text, making the user supply a single number, making the user pick a single item from a list, making the user pick several items from a list, making the user arrange the items in a list in a preferred order, making the user manage a list of items, making the user organize items in a given structure, and making the user apply one or more operations on a selection of items in a list.

10. The method of claim 7, wherein the method is executed at run time while other applications are running.

11. The method of claim 7, wherein the method is executed at design time so that user interfaces generated by the method are stored on storage media.

12. The method of claim 7, wherein the generated user interface includes a pagefunction.

13. For use in a computer system, a computer-readable medium having computer-executable instructions for performing a method for generating user interfaces by an expert system for a user to interact with the computer system, comprising:
   receiving a user interface goal by the expert system, the user interface goal including at least one of a question to be posed to the user, a piece of information to be communicated to the user, and a task to be performed by the user;
   receiving a set of parameters by the expert system, each parameter including at least one of information for presenting to the user, information for the task to be performed by the user, and information for constraining the generated user interface; and
   generating a user interface by selecting a code module from a set of code modules, each code module being designed to generate user interfaces from multiple templates, the act of selecting a code module including selecting a rule from a set of rules extracted from guidelines, conventions, and principles of user interface design, the act of selecting a rule being aided by the set of parameters, the user interface being produced from a template when the selected rule is executed.

14. The computer-readable medium of claim 13, further comprising examining selectively a set of external factors by the expert system, each factor being selected from the operating environment of the computer system and the background of the user, the act of selecting a rule being further aided by the set of external factors.

15. The computer-readable medium of claim 13, wherein a user interface goal includes at least one of making the user supply a single string of text, making the user supply a single number, making the user pick a single item from a list, making the user pick several items from a list, making the user arrange the items in a list in a preferred order, making the user manage a list of items, making the user organize items in a given structure, and making the user apply one or more operations on a selection of items in a list.

16. The computer-readable medium of claim 13, wherein the method is executed at run time while other applications are running.

17. The computer-readable medium of claim 13, wherein the method is executed at design time so that user interfaces generated by the method are stored on storage media.

18. The computer-readable medium of claim 13, wherein the generated user interface includes a pagefunction.

19. For use in a computer system, a computer-readable medium having computer-executable instructions for performing a method of producing a user interface for an application running on a computer having an associated display, said method comprising:
   a) in response to user interface designer inputs, said application producing at least one intention, said at least one intention having an associated set of parameters;
   b) supplying said at least one intention and its associated set of parameters to an expert system;
   c) in response to receiving said at least one intention and its associated set of parameters, the expert system:
      i) selecting a code module from a multitude of code modules;
      ii) selecting a rule from a set of rules within the selected code module; and
      iii) generating user interface instructions from a template associated with the selected rule;
   d) supplying said user interface instructions to said application; and
   e) in response to receiving said user interface instructions, said application producing a user interface on said display.

* * * * *

UNITED STATES PATENT AND TRADEMARK OFFICE
CERTIFICATE OF CORRECTION

PATENT NO. : 7,013,297 B2
APPLICATION NO. : 10/083022
DATED : March 14, 2006
INVENTOR(S) : Jan Thomas Miksovsky It is certified that error appears in the above-identified patent and that said Letters Patent is hereby corrected as shown below:

On the Title page, in Item (56), under "Other Publications", in column 2, line 1, delete "et al," and insert -- et al., --, therefor.

On the Title page, in Item (56), under "Other Publications", in column 2, line 3, delete "et al," and insert -- et al., --, therefor.

On the Title page, in Item (56), under "Other Publications", in column 2, line 5, delete "23-24" and insert -- 23-34 --, therefor.

In column 2, line 43, after "that" delete "a".

In column 7, line 63, delete "Illustrated" and insert -- illustrated --, therefor.

In column 11, line 7, delete ""screens"" and insert -- "screen" --, therefor.

In column 12, line 49, delete "Instep" and insert -- In step --, therefor.

In column 13, line 59, after "equal" delete "or" and insert -- to --, therefor.

Signed and Sealed this

Twenty-fifth Day of August, 2009

David J. Kappos
*Director of the United States Patent and Trademark Office*